March 24, 1970 D. J. BRITTAIN 3,502,892
PRESSURE-SENSITIVE OPTICAL SWITCH
Filed Oct. 24, 1966 6 Sheets-Sheet 1

INVENTOR
DEREK JOHN BRITTAIN
Mason, Mason & Albright
Attorneys

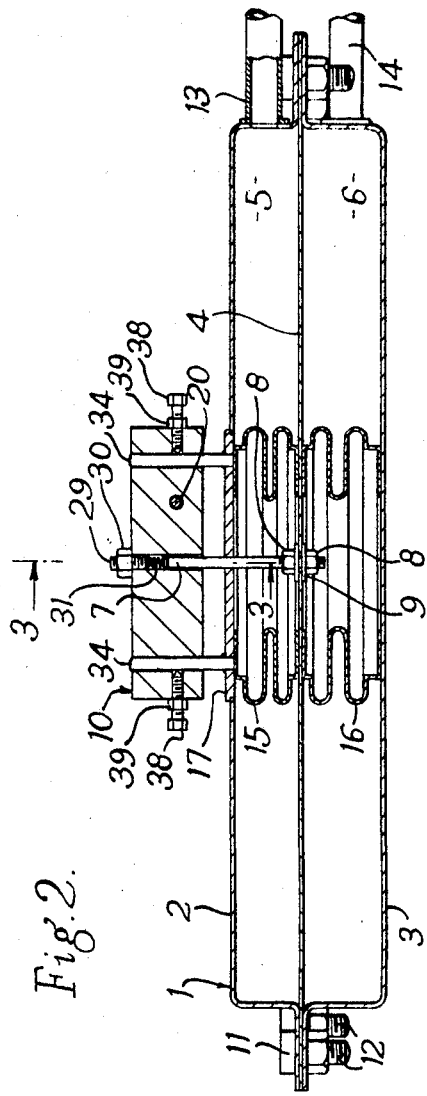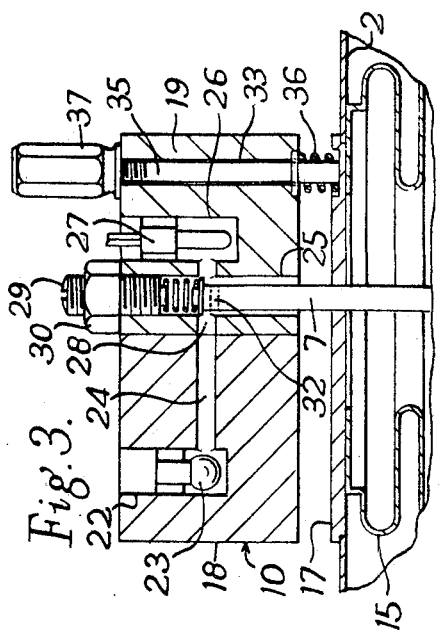

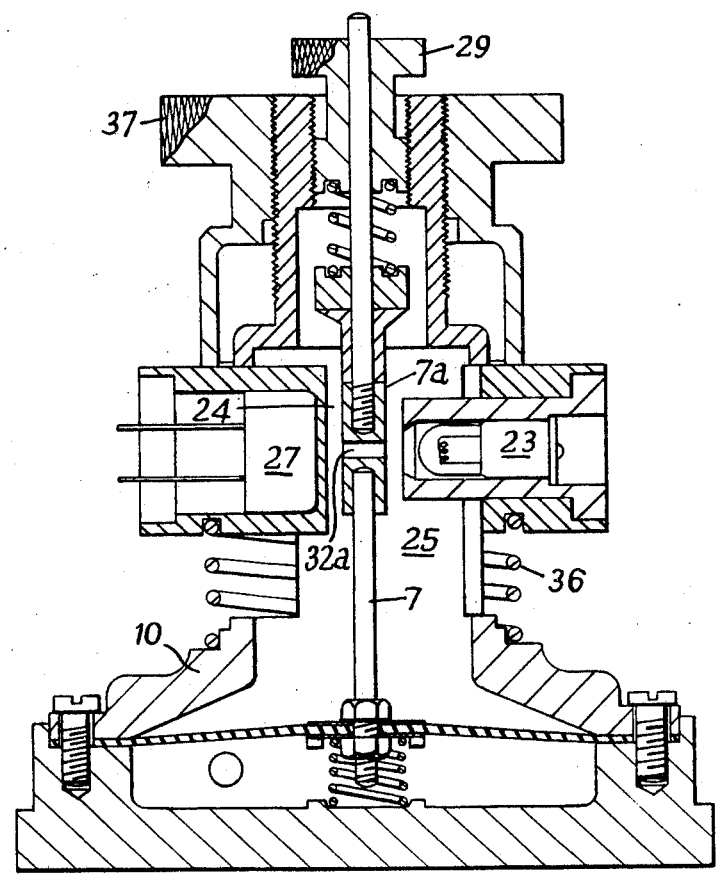

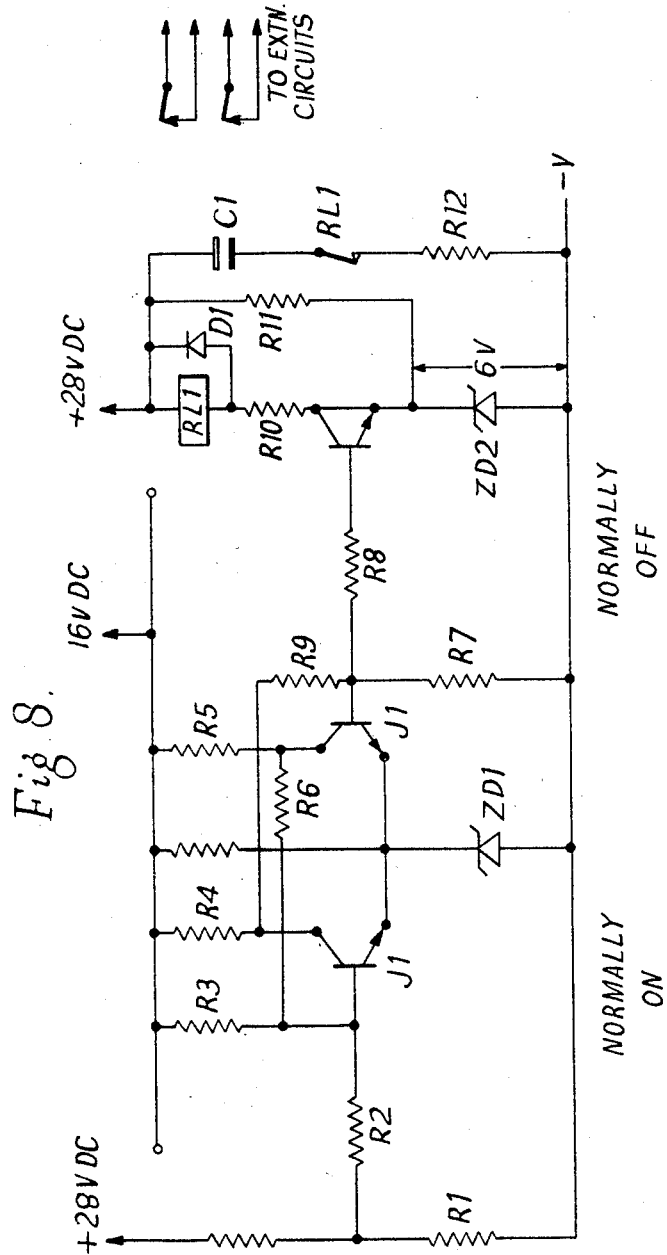
Fig. 8.
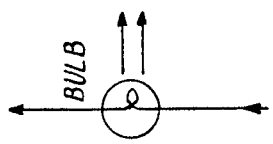
INVENTOR
DEREK JOHN BRITTAIN

United States Patent Office 3,502,892
Patented Mar. 24, 1970

3,502,892
PRESSURE-SENSITIVE OPTICAL SWITCH
Derek J. Brittain, Goring-by-Sea, England, assignor to Radon Industrial Electronics Company Limited, Worthing, Sussex, England
Filed Oct. 24, 1966, Ser. No. 588,925
Int. Cl. *G01d 5/34*
U.S. Cl. 250—231                                                        4 Claims

ABSTRACT OF THE DISCLOSURE

A switch wherein a passageway between a radiating member and a radiation sensitive member is selectively opened or blocked by a shutter member actuated by a diaphragm, a spring or bellows provided to dampen movement of the diaphragm, the position of the shutter member relative to the passageway being resiliently adjustable and the head which contains the passageway, the radiating member, and radiation sensitive member in a fixed relationship being selectively adjustable relative to the shutter member.

SUMMARY AND OBJECTS OF THE INVENTION

This invention relates to improvements in or relating to switches and is particularly concerned with a control unit for controlling and operating such switches, which includes both mechanical switches which are operated and controlled wholly or in part, by electronic means and also switches which are operated wholly electronically.

It is an object of this invention to provide a control unit of small mechanical size which can be made responsive to very small mechanical forces or changes in such forces and in particular can be made sensitive to changes in fluid pressure, especially gas pressure.

It is also an object of the present invention to provide a control unit suitable for use in an air conditioning plant, and instead of the unit controlling a relay it is also an object that electrical variation produced by the unit controls by means of transistors or valves the speed of a pump or fan motor.

Other objects of the invention will become apparent hereinafter.

In accordance with the invention a control unit for the control and operation of switches comprises a sensing head, a radiation source, a sensing element responsive to the radiation and producing a resultant variable electrical output, a first and second bore, an actuating member sensitive to and movable by changes in pressure exerted thereon, and a movable member, wherein the sensing head contains the radiation source and sensing element connected in a substantially straight line by the second bore, the first bore communicates with the second bore between the radiation source and the sensing element, one end of the movable member is connected to the actuating member and the other free end is contained in and is freely displaceable in a longitudinal direction within said first bore such that said other free end may project into and partially or completely block said second bore in direct response to the movement of the actuating member.

Advantageously the actuating member is a diaphragm. The source of radiation can comprise an electric light bulb, in which case the sensing element is made light sensitive and may be for example a cadmium sulphide photoelectric cell or a high speed photo-electric cell of the diode type. Alternatively, the source of radiation may be a source of magnetic radiation e.g. a magnet and the sensing element be a reed switch responsive thereto.

In one particular embodiment of a control unit exemplifying the invention, the diaphragm is positioned between two chambers to which two sources of fluid pressure are connected. The diaphragm will then be distendable by changes in the differential pressure across it. One of the sources of pressure can be atmospheric pressure. Unwanted vibrations of the diaphragm may be damped by the provision of bellows or a spring connected to the diaphragm.

Moreover the control unit of the invention may include provision wherein the free end of the movable member acts against the compression of a spring, the compression of which is adjustable so as to allow for adjustment of the pressure difference between the opposite sides of the diaphragm.

In a further embodiment of the invention, the position of the sensing head in the direction of the movement of the movable member is adjustable, whereby the sensitivity of the diaphragm to the differences in pressure applied to it is variable.

In another embodiment of the invention the free end of the movable member is formed as a light graded graticule.

In a still further embodiment of the invention, the movable member is formed as a rod or spigot, the free end of which may project into and partially or completely block said second bore. The rod or spigot may be formed from an opaque, transparent or translucent material thereby providing means for varying the amount of radiation received by the sensing element. In addition, the rod or spigot may include a transverse bore which is arranged to cooperate with the second bore so that at a particular position of the movable member, radiation can pass from the radiation source to the sensing element through the transverse bore and in other positions of the movable member the radiation is blocked off from the sensing element. Alternatively, the free end of the movable member is formed as a flat plate provided with a rectangular orifice which is arranged to cooperate with the second bore in like manner to the transverse bore of the rod or spigot described above.

The output from the sensing element may be amplified by suitable means and the amplified electrical variation may then control, for example, a relay or a multi-stable electric circuit.

BRIEF DESCRIPTION OF THE DRAWINGS

The invention will now be described, by way of example, with reference to the accompanying drawing, in which:

FIGURE 2 is a sectional elevation on the line 2—2 of FIGURE 1;
FIGURE 3 is an enlarged sectional detail taken on the line 3—3 of FIGURE 2;
and
FIGURE 3A shows a similar view to FIGURE 3 of an alternative unit in which the free end of the movable member is formed as a flat plate provided with a rectangular orifice.
FIGURES 4 to 8 are diagrams of circuits suitable for use with the control unit.

DESCRIPTION OF THE PREFERRED EMBODIMENTS

Figure 1:
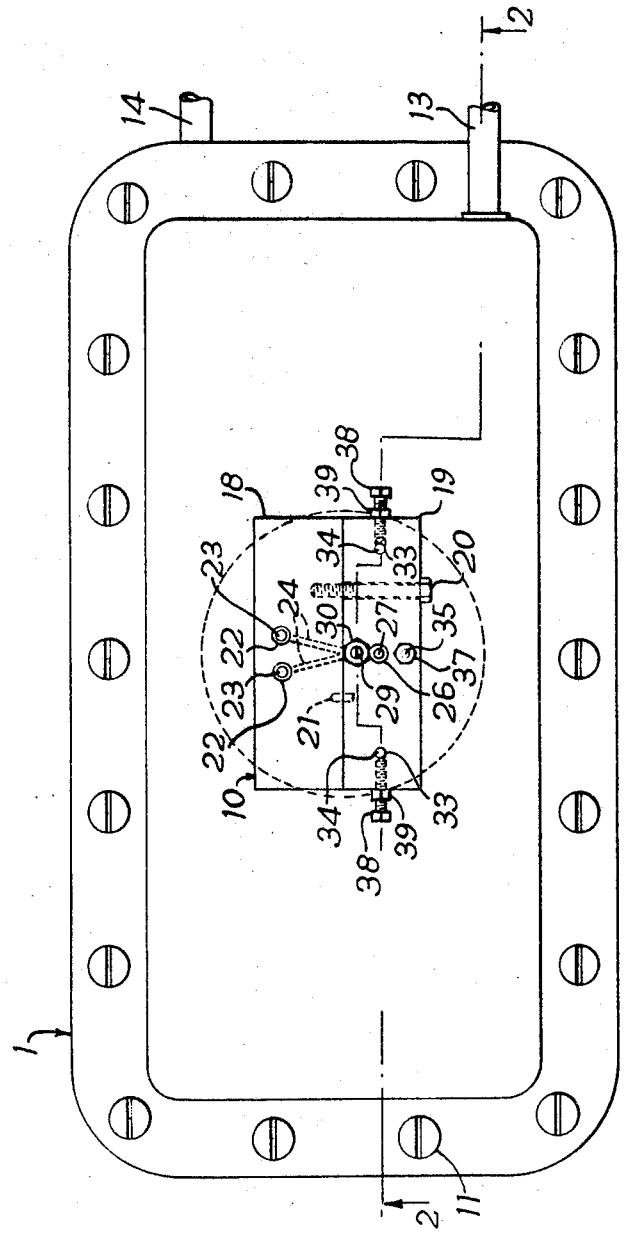
FIGURE 1 is a plan view of a control unit.

The control unit 1 shown in FIGURES 1 to 3 includes upper and lower bowl shaped members 2 and 3, respectively, between which extends a diaphragm 4 separating the space enclosed by these two bowls into upper and lower chambers 5 and 6, respectively. To approximately the centre of the diaphragm 4 is clamped a spigot 7 by means of nuts 8 and washers 9, the nuts being screwed onto the threaded lower end of the spigot 7. The upper end of the spigot 7 extends into a sensing head 10.

The rims of the two bowls 2 and 3 are clamped together with the diaphragm 4 between them by means of a plurality of nuts and bolts 11 and 12 spaced around the circumference of the rims. Inlet tubes 13 and 14 are respectively provided for the upper and lower chambers 5 and 6.

The diaphragm 4 is made of a distendable material chosen according to the application to which the control unit is to be put. Suitable materials include, for example, neoprene, fluon, nylon, rubber, stainless steel and brass. Bellows 15 and 16 are respectively attached to the upper and lower surfaces of the diaphragm 4 so as to be substantially coaxial with the spigot 7. The bellows are also respectively sealed to a circular upper plate 17 forming part of the bowl 2 and through which the spigot 7 can freely pass, and to the bowl 3. These bellows 15 and 16 assist in the balancing and centering of the diaphragm and damp any vibrations of the diaphragm. The bellows 15 also acts as a seal for the chamber 5. The bellows may be replaced by a spring.

The sensing head 10 comprises two blocks 18 and 19, of for example, metal which are held together by a bolt 20 threaded into the block 18 and a locating pin 21 which ensures correct alignment of the blocks.

The block 18 has two bores 22 which extend partway through it and in each of which is positioned a light bulb 23. Further bores 24 extend from the surface of the block 18 which is to be positioned in contact with the block 19 to each of the bores 22 so that light may pass along these bores from the bulbs 23.

The block 19 has a bore 25 passing completely through it and within which the spigot 7 is freely movable in the longitudinal direction. A bore 26 passes partway through the block 19 and in this bore is positioned a light sensitive element 27 which may be, for example, a photo-transistor, a light dependent resistor, or a photo-cell such as a selenium cell. Another bore 28 extends from the surface of the block 19 which is intended to be in contact with the block 18 through the bore 25 and into the bore 26. This bore 28 at the surface of the block 19 is intended to meet up with the two bores 24 at the surface of the block 18 so that when the spigot 7 does not interfere, light can pass from either of the bulbs 23 to the light sensitive element 27.

Into the upper end of the bore 25 is threaded a grub screw 29 having a lock nut 30. A compression spring 31 acts between the bottom of this grub screw and the top of the spigot 7.

Near to its top, the spigot 7 has a transverse bore 32 which, when the spigot is at a certain height, is arranged to allow light to pass from either of the bulbs 23 to the light sensitive element 27. If the screw 29 and the spring 31 are not provided it is alternatively possible for the bore 32 to be omitted and for the top of the spigot 7 to act as a shutter for the light passing from either of the bulbs 23 to the element 27.

Three bores 33 are provided in the block 19 and slidable within the outer two of these bores are location pins 34, the lower ends of these pins being attached to the plate 17. A further pin 35 which is also attached to the plate 17 is slidable within the central bore 33. A compression spring 36 surrounds the pin 35 and acts between the lower surface of the block 19 and the upper surface of the plate 17. A nut 37 is threaded onto the top of the pin 35, and in this way the vertical height of the sensing head 10 above the plate 17 is made adjustable by rotation of the nut 37. Once the vertical height has been adjusted this can be fixed by means of bolts 38 provided with lock nuts 39, which bolts are threaded into the block 19 so as to clamp the pins 34.

In operation a source of fluid pressure which is to be followed is applied to the chamber 5 or 6 through the inlet tube 13 or 14 and then the inlet 14 or 13 may be left open to atmospheric pressure or a source of fixed pressure may be applied to the chamber 6 or 5 through the inlet tube 14 or 13.

Alternatively, if one wishes to follow pressure differences then the inlets 13 and 14 are connected one to each of the two sources of pressure. The pressures applied to the chambers 5 and 6 act upon the diaphragm 4. Then, if for example the pressure in the chamber 6 increases and the pressure in the chamber 5 increases less rapidly, remains constant or decreases then the diaphragm 4 is displaced upwardly together with the spigot 7, and if for example before the spigot 7 was displaced, light was able to pass from the bulbs 23 to the element 27 through the bore 32 in the spigot, then after upward displacement of the spigot and bore 32 will no longer be in line with the bores 24 and 28 and light will be prevented from reaching the element 27. In this way, when the difference in pressures within the chambers 5 and 6 reaches a certain critical value there will be a sudden change in the illumination reaching the light sensitive element 27 and this sudden change can be detected electrically and amplified so as to operate, for example, a relay which in turn can control a further electrical or mechanical operation. It is, of course, equally possible for the spigot to have been moved at a certain critical pressure difference so that light is then able to pass to the element 27, whereas it had previously not been able to do so.

By adjustment of the grub screw 29 the compression in the spring 31 can be varied and in this way it is possible to alter the pressure against which the diaphragm works. Also, the height adjustment of the head 10 by unclamping the bolts 38, by adjusting the screw 37, and by rebolting the bolt 38, provides a fine adjustment of the differential pressure at which the bore 32 allows light to reach the sensitive element 27. By correct adjustment of the unit we have been able to discriminate between pressure differences at least as low as 0.05″, and at least as high as 1½″. British Standard Water Gauge with the same unit, and by a simple replacement of the spring 31 by a stiffer spring it is easily possible to use the same unit to discriminate between pressure differences of up to 20″ or more British Standard Water Gauge.

By positioning the bulbs 23 in the blocks 18 we have found that this has provided a method of screening these bulbs from the light sensitive element 27 and also since the bulbs are being continuously used if the block 18 is constructed of metal this acts as a heat sink. We prefer to use two bulbs 23 so that in the event of failure of one bulb the unit will continue to operate.

The sensing head 10 has been described as constructed from two blocks 18 and 19 which are then bolted together and we have found that this method of construction facilitates manufacture since the various bores can be more readily made, and further makes possible the manufacture of the unit in small mechanical size.

The spigot 7 may be made from any opaque material and suitable materials include steel, brass or plastics material. It is also possible to use a transparent or translucent material such, for example, as nylon which is tinted so as to graduate from transparent or translucent to opaque around the region of the bore 32 and in this way a further compensation for any vibration is provided.

Instead of directly adjusting the grub screw 29 and the nut 37 as a means for adjusting the actual pressure against which the diaphragm works and the differential pressure of the control unit, respectively, it is also possible to use calibrated means so that the unit can be readily adjusted to different known values.

In an alternative embodiment wherein the radiation is magnetic radiation the spigot may contain or be affixed to or be part of a magnet which deflects or otherwise effects the magnetic flux passing to a reel switch acting as the sensing element.

FIGURE 3A shows in a similar view to that shown in FIGURE 3 an alternative detail of a modified control unit within the scope of the invention. In this modification the second bore 24 coincides and forms at least part of the head of the first bore 25. This construction allows for a reduced mechanical size of the unit. Moreover, the free end of the spigot is formed as a flat plate 7a having a rectangular orifice 32a which acts in a similar fashion to the transverse bore 32 described above.

Operation of the modified unit is still as the previous unit described above. The sense head 10 may be placed by adjustment of the main knurled ring 37 to any position above or below, the orifice giving a relative position for an increase or decrease in ambient pressure. The operating pressure is set by the screw 29 and spring bearing on to the shutter assembly spigot. Assuming that the light source and cell have been set above the shutter orifice, a pressure applied in the lower chamber against the diaphragm will cause the shutter to rise against the spring when the shutter aperture coincides with the light source. The light path is made to the photosensitive cell which controls the switch circuitry.

The sensing head 10 may also be constructed so that instead of using visible light, infra-red or ultraviolet, magnetic flux or radio-active radiation rays are employed, and a suitable sensing element 27 is then used.

Figure 4:
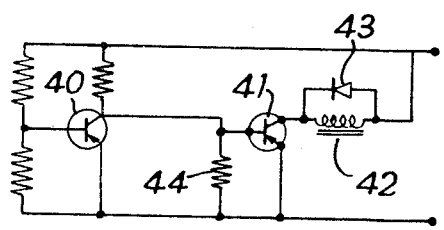

FIGURES 4 to 8 illustrate, by way of example, some of the various electrical circuits which can be employed with the control unit 1. FIGURE 4 shows a circuit which includes a light sensitive transistor 40 for the light sensitive element 27. This circuit also includes a further transistor 41 acting as an amplifier which has a collector load constituted by a relay 42 in parallel with a diode 43. The resistor 44 may be of variable resistance so that the sensitivity of the amplifying circuit can be adjusted, and in this way a final adjustment of the differential pressure setting of the sensing head can be obtained.

Figure 5:
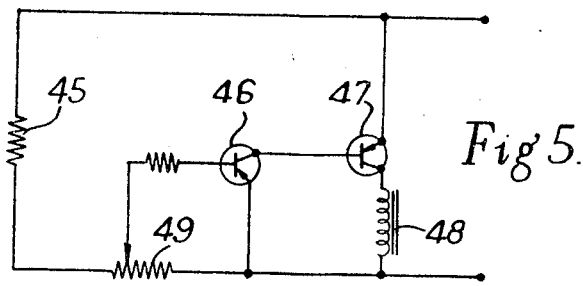

The circuit of FIGURE 5 is illustrated as including a light dependent resistor 45 constituting the light sensitive element 27. This circuit also includes transistors 46 and 47 which amplify changes in the circuit brought about by the variable resistance of the resistor 45 and the amplifying current through the resistor 47 is used to operate a relay 48 included as its collector load. This resistance also includes a variable tapped resistor 49 for adjustment of the sensitivity of the circuit.

Figure 6:
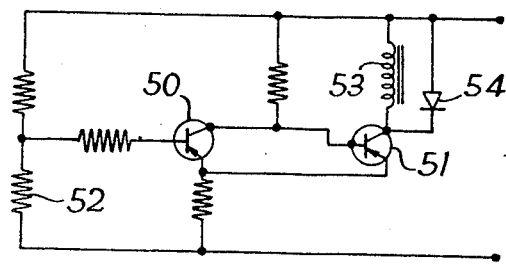

In the circuit of FIGURE 6 which includes a photo-transistor 50 and an amplifying transistor 51 is included a temperature dependent resistor 52. This resistor is employed to provide temperature compensation for the circuit. The collector or the transistor has a load constituted by a relay 53 and a diode 54 in parallel.

In all of those circuits just described the relays 42, 48 and 53 can be used to control further circuits such, for example, as a multi-stable electric circuit and/or mechanical switches or other operations which are to be controlled by detection of a particular pressure difference between the chambers 5 and 6.

Figure 7:
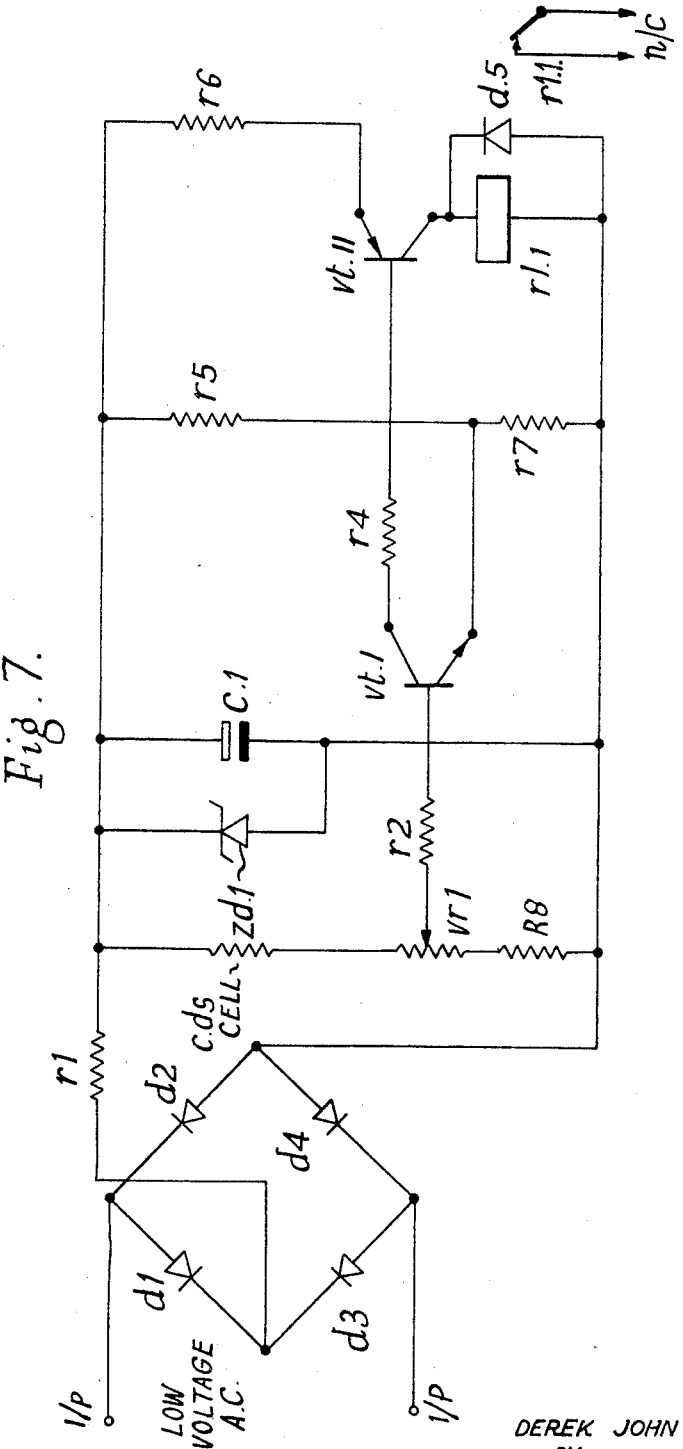

These circuits can also be provided with one or more extra stages so as to increase the sensitivity, and in general the amplifying circuit can be a simple single stage amplifier or a D.C. chopper amplifier having temperature compensation, or Schmitt trigger, alternatively a thyristor trigger and pulse unit, for such applications as motor speed control and solenoid operation. Thus, FIGURE 7 illustrates a circuit suitable for use with a cadmium sulphide photoelectric cell as the sensing element. In this circuit the output of the cell is amplified and taken to a Schmitt trigger system which in time operates a thyristor trigger unit which may in turn operate a speed control system. In FIGURE 8 a typical trigger circuit is illustrated which is suitable for use in conjunction with a pressure switch.

Also, these circuits may include valves, although we prefer to use transistors in view of their compactness and reliability. Power supplies for these circuits can be included so that the unit can operate off the mains or alternatively the unit can be supplied with battery power. In view of the simplicity of these circuits when using transistors, they can be mounted on circuit boards fixed to the top of the bowl 2 and the whole unit can then be enclosed within a protective casing so as to give a complete yet compact unit.

An example of the use of the control unit is in an air conditioning system, and instead of the unit controlling a relay it is also possible for the electrical variation produced by the sensitive element to control by means of transistors or valves the speed of a pump or fan motor. In this case the spigot 7 may be arranged to give a gradual cut-off of the light reaching the sensitive element 27 the output from which can be amplified so as to continuously vary the speed of the motor. The use of a control unit having a cadmium sulphide photoelectric cell and a movable member in which the free end is in the form of a light graded graticule is particularly advantageous for this application.

Having thus described my invention, what I claim as new and desire to secure by Letters Patent of the United States is:

1. A control unit for the control and operation of switches which comprises:
   a light sensing head;
   a radiation source;
   a sensing element which is responsive to radiation from said radiation source, said sensing element adapted to produce a variable electric output which is governed by the amount of said radiation received by said sensing element;
   a first bore in sad sensing head;
   a second bore also included in said sensing head and providing a straight line of communication between said radiation source and said sensing element;
   said first bore intersecting said second bore;
   a diaphragm positioned between two chambers, to which chambers may be connected two sources of fluid pressure variable to move said diaphragm, and having vibration-damping means connected thereto;
   a movable member connected at one end to said diaphragm so as to move therewith, said movable member received in part in said first bore and having a free end which may project into said second bore formed as a flat plate having a port to pass radiation between said source and sensing head in one position and to block radiation in other positions of said movable member;
   adjustable resilient means in said sensing head urging said movable member toward said one end for controlling the pressure necessary to move said movable member a critical distance;
   guide means included in said sensing head defining a path of movement for said movable member whereby it is movable at the intersection of said bores in a longitudinal direction only; and
   a port disposed in said movable member at said intersection;
   said movable member adapted to displace said port and thereby obstruct said line of communication in said second bore by an amount functionally related to the movement of said diaphragm;
   said radiation source and said sensing element mounted on said sensing head whereby all such components are readily adjustable as a unit relative to said movable member and the response of said sensing element to said diaphragm may be selectively varied for different critical movements of said actuating member.

2. A control unit as claimed in claim 1, wherein said resilient means is a spring, the compression of which is adjustable so as to allow for adjustment of the pressure difference between the opposite sides of the diaphragm.

3. A control unit as claimed in claim 1, wherein the position of the sensing head in the direction of the movement of the movable member is adjustable, whereby the sensitivity of the diaphragm to the differences in pressure applied to it is variable.

4. A control unit as claimed in claim 1, including a light graded graticule forming the free end of the movable member.

References Cited

UNITED STATES PATENTS

| | | | |
|---|---|---|---|
| 2,412,541 | 12/1946 | Shivers | 73—398 X |
| 2,320,720 | 6/1943 | Croft | 250—231 X |
| 2,386,275 | 10/1945 | Sigmund et al. | 250—231 X |
| 2,945,376 | 7/1960 | Gehre | 92—37 X |
| 2,965,137 | 12/1960 | Leeson et al. | 92—37 |
| 3,084,550 | 4/1963 | Bowditch | 92—37 X |
| 3,100,997 | 8/1963 | Lorenz. | |
| 3,122,922 | 3/1964 | Kramer. | |
| 3,159,750 | 12/1964 | Kazan | 250—231 |
| 3,360,657 | 12/1967 | Shlesinger | 250—227 |

ROBERT SEGAL, Primary Examiner

U.S. Cl. X.R.

73—398